Sept. 30, 1924. 1,510,299
A. M. BRENNE
FRICTION SHOCK ABSORBING MECHANISM
Filed Dec. 22, 1922  2 Sheets-Sheet 2
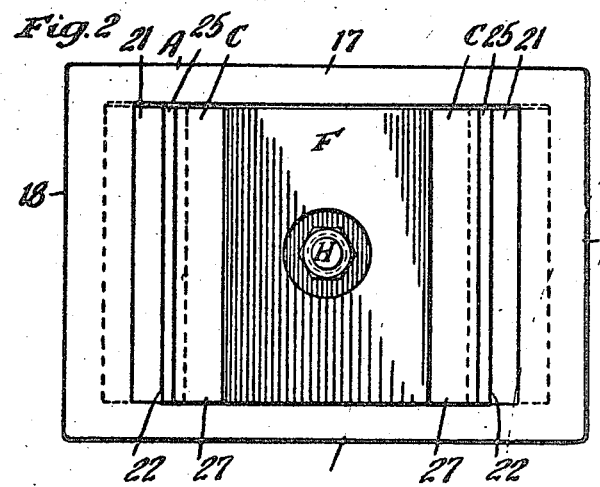
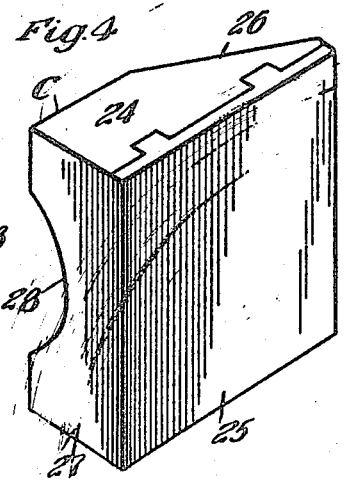
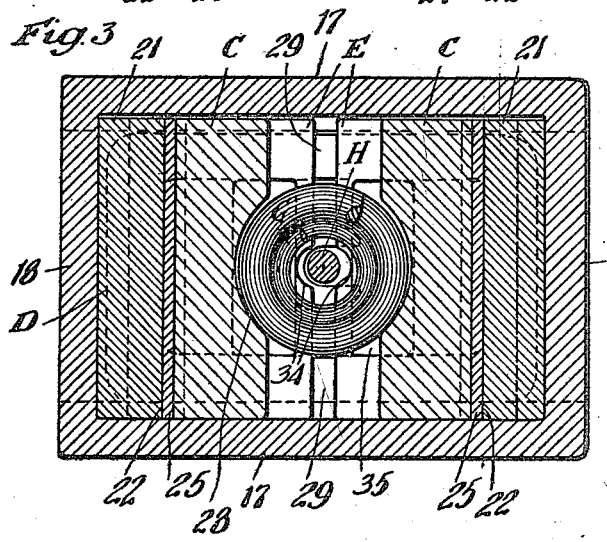
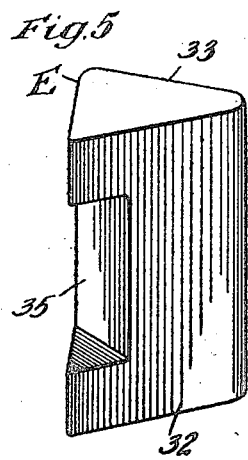
Witnesses
Wm. Geiger
Inventor
Arild M. Brenne
By Geo. A. Haight his Atty.

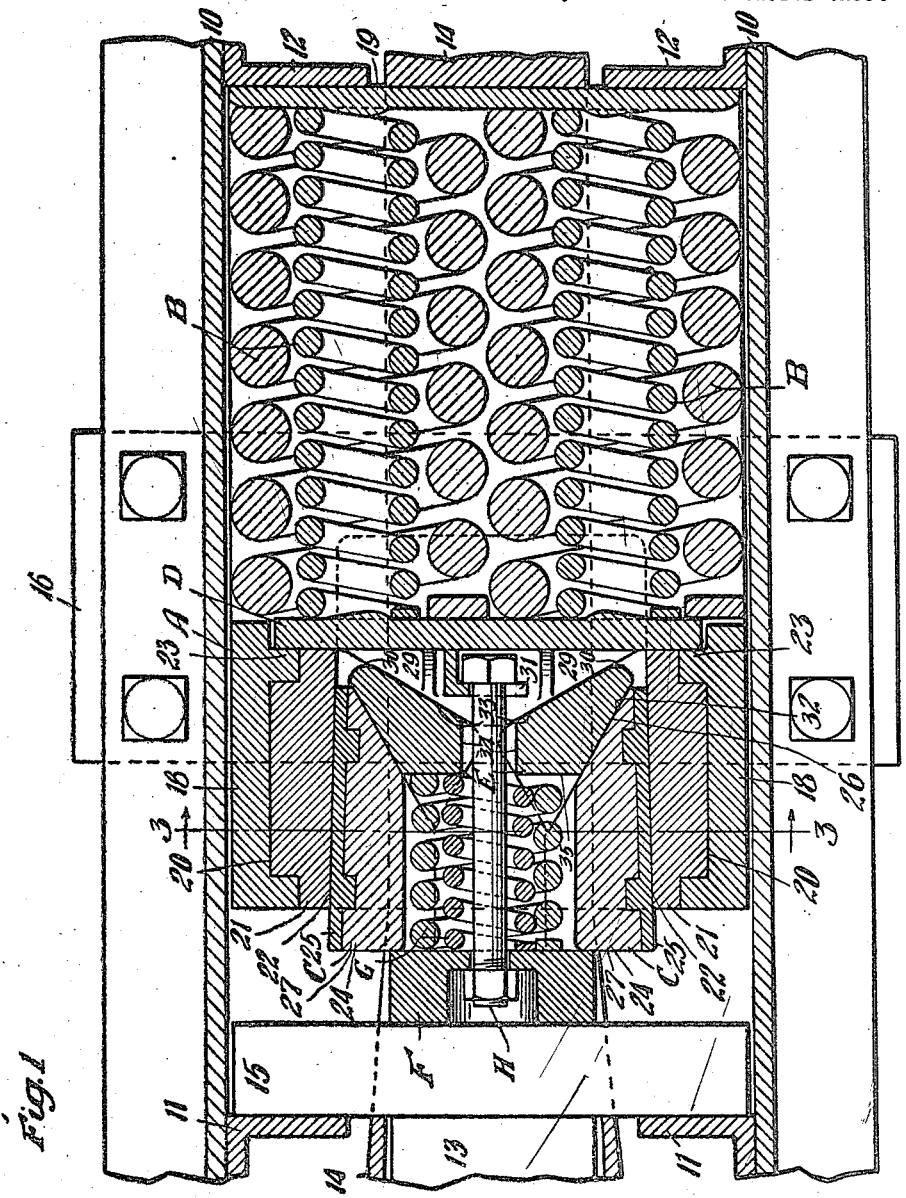

Patented Sept. 30, 1924.

1,510,299

UNITED STATES PATENT OFFICE.

ARILD M. BRENNE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 22, 1922. Serial No. 608,402.

*To all whom it may concern:*

Be it known that I, ARILD M. BRENNE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings, wherein are obtained high capacity and easy release.

Another object of the invention is to provide a mechanism of the character indicated wherein a wedging or spreading system is employed of such character that keen angle effect is produced during compression and blunt angle effect in release.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith. Figure 2 is a front end elevation of the shock absorbing mechanism proper. Figure 3 is a vertical, transverse, sectional view of the shock absorbing mechanism corresponding to the line 3—3 of Figure 1. And Figures 4 and 5 are detail perspectives of one of the friction shoes and one of the wedge elements, respectively.

In said drawings, 10—10 denote channel draft sills of a car underframe to the inner faces of which are secured front stop lugs 11 and rear stop lugs 12. A portion of a drawbar is indicated at 13, the same being operatively associated with the shock absorbing mechanism proper by a hooded cast yoke 14 within which is disposed the shock absorbing mechanism proper and a front follower 15. The yoke and parts therewithin are supported in operative position by a detachable saddle plate 16.

The preferred embodiment of the shock absorbing mechanism proper, comprises a combined friction shell and spring cage casting A; twin arranged springs B—B; a pair of wedge-friction-shoes C—C; a spring follower D; a pair of wedge elements E—E; a pressure-transmitting block F; a secondary spring G; and a retainer bolt H.

The casting A, as shown, is of rectangular cross section, having top and bottom walls 17—17, side walls 18—18 and vertical integral rear wall 19. The side walls 18 are made relatively short so as to leave the major portion of the sides of the casting open to permit of the insertion and removal of the springs and spring follower. The inner faces of the side walls 18 are recessed as indicated at 20 to form seats for wear-resisting liners 21, the latter, on their inner sides, having longitudinally extending friction surfaces 22 which are converged slightly inwardly of the friction shell.

The twin springs B bear at their rear ends upon the wall 19 of the casting A and at their forward ends upon the spring follower D. The latter is limited in its forward movement with respect to the casting A, by engagement with shoulders 23—23 formed on the casting, as shown in Figure 1.

The two friction shoes C are of like construction, each preferably consisting of a cast block 24 to the outer face of which is applied a wear plate 25, the latter providing a friction surface cooperable with the corresponding shell friction surface 22. At its inner end, each shoe C is formed with a wedge face 26, the latter diverging inwardly of the shell and extending at a relatively acute angle with respect to the axis and forces applied parallel thereto. The shoes C, at their front ends, have flat bearing faces 27, with which engages the pressure-transmitting block F. On their inner sides, the shoes C are provided with curved longitudinally extending recesses 28 to provide the necessary clearance to accommodate the secondary spring G.

On its forward side, the spring follower D is provided with forwardly extended enlargements 29 each of which is provided with rearwardly diverging inclined faces 30—30 symmetrically arranged with respect to the axis of the shell. Said faces 30 extend at a very blunt angle with respect to the axis of the mechanism, as clearly shown in Figure 1. Intermediate the enlargements 29 and centrally of the follower D, the latter is provided with an overhanging slotted flange 31 beneath which is engaged the head of the retainer bolt H. The nut end of the bolt H is accommodated in a suitable recess provided in the block F. With this arrangement, it is evident that the parts will be held in assembled relation and also that the secondary spring G may be placed under an initial compression.

The two wedge members E are of like construction, each having an outer wedge face 32 cooperable with the corresponding shoe-wedge face 26. On its inner side, each wedge member E is provided with an inclined face 33 extending at the same angle as and cooperable with the corresponding faces 30 of the follower D. The wedge members E are suitably notched as indicated at 34 to provide clearance for the shank of the bolt H. Said members E are further provided with flat transversely extending bearing faces 35 upon which is seated the inner end of the secondary spring G, the outer end of the latter bearing against the block F.

The operation of the mechanism, assuming a compression stroke under buff, is as follows. As the drawbar moves inwardly, the front follower 15, block F and shoes C will be forced to travel longitudinally in unison therewith. Due to the taper of the shell friction surfaces, there will be a gradual movement of the shoes C laterally toward each other as the compression stroke takes place. Resisting this movement, is the capacity of the two springs B acting through the follower D and inclined faces 30 thereof upon the wedge members E. As the shoes C approach each other laterally, a pinching action will take place on the members E. due to the differential action which necessarily occurs. This pinching or differential action induces a squeezing out of the members E from between the corresponding sets of faces 26 and 30 of the shoes and follower, respectively. This action is accommodated by further compression of the secondary spring G. In this connection, it will be observed that there will be a resultant component along the engaging faces 30 and 33 toward the center of the mechanism which is derived in part from the applied compression force and in part from an inwardly directed transverse force induced by the taper of the friction shell. The angle of the faces 30, 33; 32, 26 and the degree of taper of the shell will be dependent upon the several factors of coefficient of friction between the various metals. During the compression stroke, there will be a certain amount of expansion of the cylinder which, upon removal of the actuating force, will act in a direction inwardly toward the axis of the mechanism and be transmitted through the cooperating faces 30 and 33 to insure release.

Wear of the parts will be compensated for by the secondary or compensating spring G which will automatically gradually serve to force the wedge members E outwardly, it being understood that the spring G is placed under an initial compression when the gear is assembled.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell having interior opposed friction surfaces; of a main spring resistance; pressure-receiving and transmitting friction shoes cooperable with the friction surfaces of the shell, said shoes, at their inner ends, having wedge faces diverging inwardly of the shell and extending at a keen wedging angle with respect to the axis thereof; a spring follower; wedge elements interposed between said follower and the wedge faces of said shoes and cooperable with both; and spring means co-acting with said wedge elements normally tending to force the latter outwardly of the shoes.

2. In a friction shock absorbing mechanism, the combination with a friction shell having interior opposed friction surfaces converged inwardly of the shell; a spring resistance; pressure-receiving and transmitting friction shoes cooperable with the shell and having wedge faces at their inner ends diverging inwardly of the shell and extending at a relatively acute angle with respect to the axis thereof; a follower disposed between said spring resistance and the shoes; wedge elements interposed between said follower and the wedge faces of said shoes and cooperable with both; and means yieldingly tending to force said wedge elements laterally.

3. In a friction shock absorbing mechanism, the combination with a friction shell having interior opposed friction surfaces; of a spring resistance; pressure-receiving and transmitting friction shoes cooperable with the shell, said shoes having wedge faces at their inner ends diverging inwardly of the shell and extending at an acute angle with respect to the axis thereof; a spring follower disposed between said spring resistance and the inner ends of the shoes, said follower, on its front side, being provided with faces diverging inwardly of the shell and extending at a blunt angle with respect thereto; wedge elements interposed between said diverging faces of the follower and the wedge faces of the shoes; and spring means coacting with said wedge elements.

4. In a friction shock absorbing mechanism, the combination with a friction shell having interior opposed friction surfaces converged inwardly of the shell; of a spring resistance; pressure-receiving and transmitting friction shoes cooperable with the shell and having wedge faces at their inner ends extending at a relatively acute angle with respect to the axis of the shell and diverging inwardly thereof; a spring follower disposed between said spring resistance and the inner ends of said shoes, said follower having faces on the side thereof adjacent the shoes inclined at a relatively blunt angle with respect to the axis of the shell and diverging inwardly thereof; wedge elements interposed between said shoe-wedge faces and inclined faces of the follower; and spring means coacting with said wedge elements.

5. In a friction shock absorbing mechanism, the combination with a friction shell having interior opposed friction surfaces; of a main spring resistance; of friction shoes cooperable with the shell and having wedge faces at their inner ends extending at a keen angle with respect to the axis of the shell and diverging inwardly thereof; a spring follower disposed between said main spring resistance and the inner ends of the shoes; wedge elements interposed between said wedge faces of the shoes and the follower; a front pressure-transmitting member; and a spring interposed between said member and said wedge elements.

6. In a friction shock absorbing mechanism, the combination with a friction shell having interior opposed friction surfaces; of a main spring resistance; friction shoes cooperable with said shell and having wedge faces at their inner ends extending at a keen angle relatively to the axis of the shell and diverging inwardly of the latter; a spring follower disposed between said main spring resistance and the inner ends of said shoes, said follower having, on its front side, faces inclined at a relatively blunt angle with respect to the axis of the mechanism and diverging inwardly of the shell; wedge elements interposed between said shoe-wedge faces and follower inclined faces; a front pressure-transmitting member; and a spring interposed between said member and said wedge elements.

7. In a friction shock absorbing mechanism, the combination with a friction shell having interior opposed friction surfaces converged inwardly of the shell; of a main spring resistance; friction shoes cooperable with said shell and provided at their inner ends with wedge faces diverging inwardly of the shell and extending at a relatively acute angle with respect to the axis thereof; a follower disposed between said spring resistance and the inner ends of the shoes and provided on its forward side with faces inclined at a relatively blunt angle with respect to the axis of the mechanism and diverging inwardly of the shell; wedge elements interposed between the shoe-wedge faces and the inclined faces of the follower; an outer pressure-receiving and transmitting member bearing upon the outer ends of said shoes; and a spring interposed between said member and the wedge elements.

In witness that I claim the foregoing I have hereunto subscribed my name this 28th day of October 1922.

ARILD M. BRENNE.

Witnesses:
H. M. DEAMER,
FRANCES SAVAGE.